(12) United States Patent
Kawai

(10) Patent No.: US 10,200,117 B2
(45) Date of Patent: Feb. 5, 2019

(54) OPTICAL COMMUNICATION DEVICE, OPTICAL COMMUNICATION SYSTEM, AND OPTICAL COMMUNICATION METHOD

(71) Applicant: NEC Corporation, Tokyo (JP)

(72) Inventor: Motoyoshi Kawai, Tokyo (JP)

(73) Assignee: NEC Corporation, Tokyo (JP)

( * ) Notice: Subject to any disclaimer, the term of this patent is extended or adjusted under 35 U.S.C. 154(b) by 38 days.

(21) Appl. No.: 15/500,748

(22) PCT Filed: Jul. 30, 2015

(86) PCT No.: PCT/JP2015/003856
§ 371 (c)(1),
(2) Date: Jan. 31, 2017

(87) PCT Pub. No.: WO2016/017181
PCT Pub. Date: Feb. 4, 2016

(65) Prior Publication Data
US 2017/0230109 A1  Aug. 10, 2017

(30) Foreign Application Priority Data

Aug. 1, 2014  (JP) .............................. 2014-157718

(51) Int. Cl.
*H04B 10/038* (2013.01)
*H04J 14/02* (2006.01)
*H04B 10/077* (2013.01)

(52) U.S. Cl.
CPC ....... *H04B 10/038* (2013.01); *H04B 10/0773* (2013.01); *H04J 14/0212* (2013.01)

(58) Field of Classification Search
None
See application file for complete search history.

(56) References Cited

U.S. PATENT DOCUMENTS 8,260,141 B2    9/2012  Berg
2003/0138252 A1*  7/2003  Paiam ................ H04Q 11/0005
                                                               398/49
(Continued)

FOREIGN PATENT DOCUMENTS

CN    103155461 A    6/2013
CN    102474379 B    1/2015
(Continued)

OTHER PUBLICATIONS

Extended European Search Report issued by the European Patent Office dated Mar. 9, 2018, in corresponding European application No. EP 15826474.

(Continued)

*Primary Examiner* — Nathan M Cors
*Assistant Examiner* — David W Lambert
(74) *Attorney, Agent, or Firm* — Finnegan, Henderson, Farabow, Garrett & Dunner, L.L.P.

(57) ABSTRACT

To provide an optical communication technology that brings flexibility to ROADM systems.
An optical communication device according to the present invention drops and adds an optical signal from and to wavelength-division multiplexed optical signals that are transmitted on a main path between network terminal stations, the device including: first means and second means capable of selecting an optical signal of a predetermined wavelength from inputted optical signals and of outputting the selected optical signal; third means for splitting optical signals inputted from a first terminal station on the main path into the first means and the second means; fourth means for splitting optical signals inputted from a branch path in the network into the first means and the second means; and fifth means capable of selectively outputting to a second terminal
(Continued)

station on the main path either an optical signal outputted by the first means or an optical signal outputted by the second means.

13 Claims, 10 Drawing Sheets

(56) References Cited

U.S. PATENT DOCUMENTS

| | | | |
|---|---|---|---|
| 2007/0014513 | A1 | 1/2007 | Isomura et al. |
| 2008/0138068 | A1* | 6/2008 | Akiyama ............ H04J 14/0209 398/50 |
| 2010/0034532 | A1* | 2/2010 | Ghelfi ................. H04J 14/0204 398/2 |
| 2012/0087658 | A1 | 4/2012 | Jander |
| 2012/0114335 | A1 | 5/2012 | Marcerou et al. |

FOREIGN PATENT DOCUMENTS

| | | |
|---|---|---|
| EP | 0938244 A2 | 8/1999 |
| EP | 2 273 708 A1 | 1/2011 |
| JP | 58-143634 | 8/1983 |
| JP | 2010-130575 | 6/2010 |
| JP | 2010-283446 | 12/2010 |
| JP | 2011-109173 | 6/2011 |
| JP | 2011-181985 | 9/2011 |
| JP | 2012-15726 | 1/2012 |
| JP | 2012-531866 | 12/2012 |
| JP | 2013-541301 | 11/2013 |
| WO | WO 2008-031452 A1 | 3/2008 |
| WO | WO 2011/000786 A1 | 1/2011 |
| WO | WO 2012/051260 A1 | 4/2012 |

OTHER PUBLICATIONS

Liangjia Zong et al: "Ultra-compact contentionless ROADM architecture with high resilience based on flexible wavelength router", OFC 2014, OSA, XP032632950, DOI: 10.1109/OFC.2014.6887098, Mar. 9, 2014, pp. 1-3.

Notification of First Office Action by the State Intellectual Property Office of The People's Republic of China in counterpart Chinese Patent Application No. 201580041901.8, dated Jan. 29, 2018.

Hiroyuki Matsumoto, et al., "Nest Generation WDM System", Fujitsu, vol. 57, No. 4, pp. 378-383 (Jul. 2006).

H. Matsumoto et al., "Next Generation WDM System", Fujitsu, vol. 57, No. 4, pp. 378-383, Jul. 2006.

International Search Report and Written Opinion dated Aug. 25, 2015, in corresponding PCT International Application.

* cited by examiner

OPTICAL COMMUNICATION DEVICE, OPTICAL COMMUNICATION SYSTEM, AND OPTICAL COMMUNICATION METHOD

CROSS-REFERENCE TO RELATED PATENT APPLICATIONS

This application is a National Stage Entry of International Application No. PCT/JP2015/003856, filed Jul. 30, 2015, which claims priority from Japanese Patent Application No. 2014-157718, filed Aug. 1, 2014. The entire contents of the above-referenced applications are expressly incorporated herein by reference.

TECHNICAL FIELD

The present invention relates to an optical communication technology, and more particularly, to a reconfigurable optical add-drop multiplexer (ROADM) technology in a wavelength-division multiplex (WDM) optical communication system.

BACKGROUND ART

In general, a branching device with the optical add-drop multiplexer (OADM) function is introduced into a WDM optical communication system. Conventionally, in order to change a network configuration in such optical communication system, paths and wavelengths in the branching device with the OADM function have to be reconfigured by replacing components such as optical filters.

In view of such circumstances, there has recently been an increasing demand for a branching device with the ROADM function, which allows for flexible reconfiguration of a network being already in operation. The ROADM function can be fulfilled by using a wavelength selective switch (WSS) that has splitting, switching, and combining functions. Devices provided with the ROADM function are disclosed in, for example, PTL 1 to PTL 4.

PTL 1 discloses an ROADM branching device based on a WSS. According to PTL 1, wavelength-division multiplexed signals inputted to the branching device are combined and subjected to wavelength selection in a WSS and then outputted.

CITATION LIST

Patent Literature

[PTL 1] Japanese Unexamined Patent Application Publication No. 2012-15726
[PTL 2] Japanese Unexamined Patent Application Publication No. 2010-130575
[PTL 3] Japanese Unexamined Patent Application Publication No. 2010-283446
[PTL 4] Japanese Unexamined Patent Application Publication No. 2011-109173

SUMMARY OF INVENTION

Technical Problem

According to PTL 1, functions to select wavelengths to be outputted are centered on a WSS located on the output-side of the branching device. Thus, the technique described in PTL 1 makes it is difficult to flexibly deal with changes in the state of the device or network to, for example, continue providing communication services in case of a failure in any WSS.

The present invention has been created in view of the problems described above, and an object of the invention is to provide an optical communication technology that brings flexibility to an ROADM system.

Solution to Problem

To achieve the aforementioned object, an optical communication device according to the present invention drops and adds an optical signal from and to wavelength-division multiplexed optical signals that are transmitted on a main path between network terminal stations, the device including: first means and second means capable of selecting an optical signal of a predetermined wavelength from inputted optical signals and of outputting the selected optical signal; third means for splitting optical signals inputted from a first terminal station on the main path into the first means and the second means; fourth means for splitting optical signals inputted from a branch path in the network into the first means and the second means; and fifth means capable of selectively outputting to a second terminal station on the main path either an optical signal outputted by the first means or an optical signal outputted by the second means.

To achieve the aforementioned object, an optical communication method according to the present invention is a method for dropping and adding an optical signal from and to wavelength-division multiplexed optical signals that are transmitted on a main path between network terminal stations, the method including: splitting optical signals inputted from a first terminal station on the main path into first and second wavelength selecting units that are capable of selectively outputting a predetermined wavelength; splitting optical signals inputted from a branch path in the network into the first and second wavelength selecting units; and selectively outputting to a second terminal station on the main path either an optical signal outputted by the first wavelength selecting unit or an optical signal outputted by the second wavelength selecting unit.

To achieve the aforementioned object, an optical communication system according to the present invention includes: an optical communication device dropping and adding an optical signal from and to wavelength-division multiplexed optical signals that are transmitted on a main path between network terminal stations; and a control device controlling the optical communication device, wherein the optical communication device includes: first means and second means capable of selecting an optical signal of a predetermined wavelength from inputted optical signals and of outputting the selected optical signal; third means for splitting optical signals inputted from a first terminal station on the main path to the optical communication device into the first means and the second means; fourth means for splitting optical signals inputted from a branch path in the network to the optical communication device into the first means and the second means; and fifth means capable of outputting an optical signal to a second terminal station on the main path, and wherein the control device instructs the optical communication device to cause the fifth means to selectively output either an optical signal outputted by the first means or an optical signal outputted by the second means.

Advantageous Effects of Invention

The above-described aspects of the present invention can provide an optical communication technology that brings flexibility to ROADM systems.

DESCRIPTION OF EMBODIMENTS

First Example Embodiment

An optical add-drop multiplexer 300 according to a first example embodiment of the present invention has a function to split wavelength-division multiplexed optical signals being transmitted in an optical communication network. According to the present example embodiment, the optical add-drop multiplexer 300, which includes a plurality of wavelength selecting units that selectively output optical signals of predetermined wavelengths from among inputted wavelength-division multiplexed optical signals, outputs an optical signal of a desired wavelength by selecting one of the wavelength selecting units. The optical add-drop multiplexer 300 outputs an optical signal coming from an appropriate wavelength selecting unit, thereby ensuring flexibility of an ROADM device.

Figure 1:
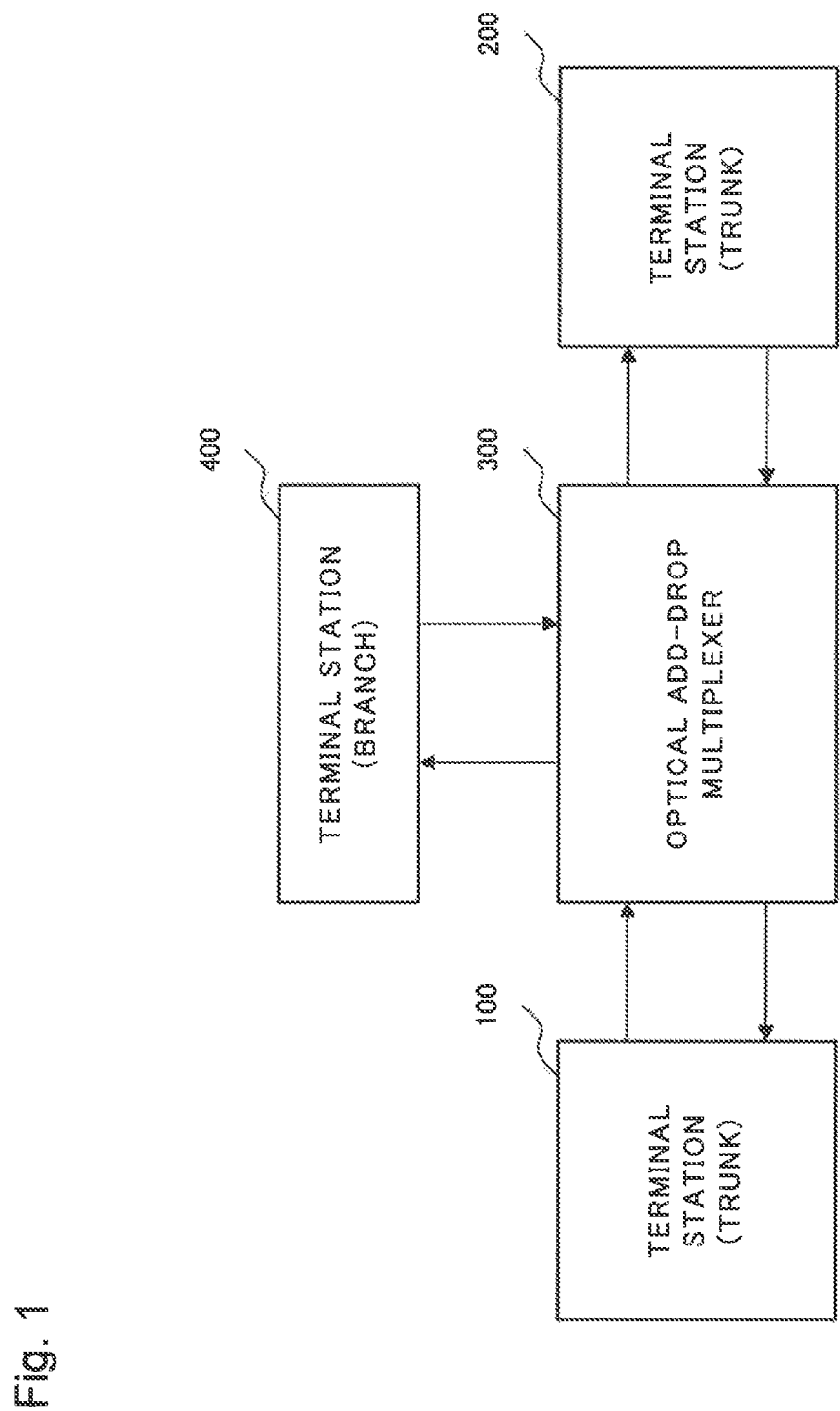
FIG. 1 is a system configuration diagram illustrating an optical communication system according to a first example embodiment.

FIG. 1 is a system configuration diagram illustrating an optical communication system according to the present example embodiment. With reference to FIG. 1, the optical communication system includes two terminal stations (trunk stations) 100 and 200, an optical add-drop multiplexer 300, and a terminal station (branch station) 400.

The terminal stations (trunk stations) 100 and 200 perform WDM optical communications with each other via optical transmission lines. Each of the terminal stations 100 and 200 has a function to transmit, and a function to receive, wavelength-division multiplexed optical signals.

The optical add-drop multiplexer 300 branches the optical transmission line between the terminal stations 100 and 200, the line constituting the main path in the optical communication network, to the terminal station (branch station) 400 on a branch path in the optical communication network. Specifically, the optical add-drop multiplexer 300 drops an optical signal of a predetermined wavelength from wavelength-division multiplexed optical signals transmitted between the terminal stations 100 and 200, and sends the signal to the terminal station 400 on the branch path (the Drop function). In addition, the optical add-drop multiplexer 300 adds an optical signal of a predetermined wavelength sent from the terminal station 400 to the optical signals transmitted between the terminal stations 100 and 200 (the Add function).

The following description assumes that, by way of example, the terminal station 100 is a station transmitting optical signals while the terminal station 200 is a station receiving optical signals. Likewise, by way of example, it can be assumed that the terminal station 200 is a transmitting station and the terminal station 100 is a receiving station.

Figure 2:
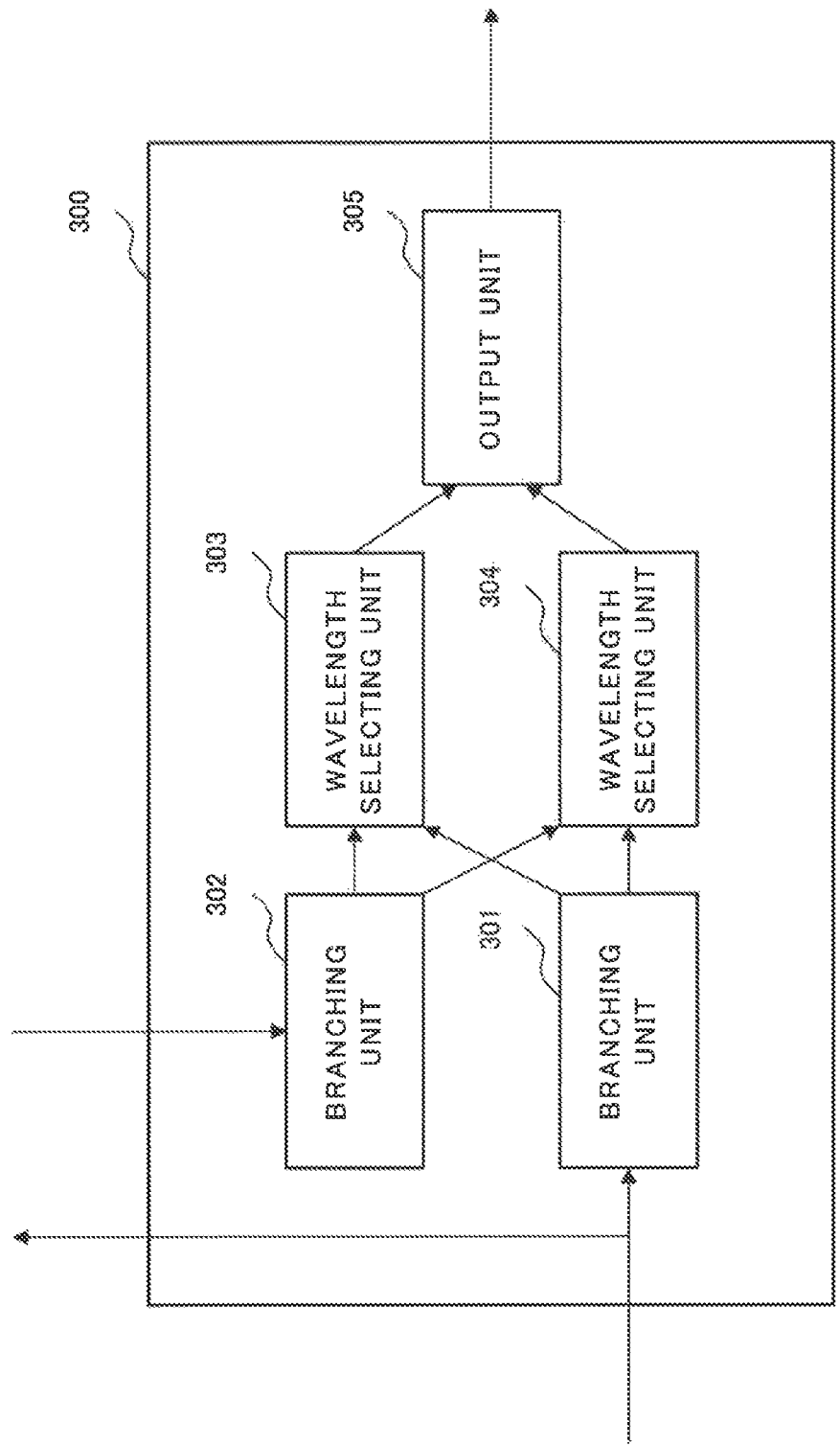
FIG. 2 is a block configuration diagram illustrating an optical add-drop multiplexer 300 according to the first example embodiment.

FIG. 2 is a block configuration diagram illustrating the optical add-drop multiplexer 300. The optical add-drop multiplexer 300 in FIG. 2 includes a branching unit 301, a branching unit 302, a wavelength selecting unit 303, a wavelength selecting unit 304, and an output unit 305.

The branching unit 301 splits wavelength-division multiplexed optical signals that are inputted from the terminal station 100 to the optical add-drop multiplexer 300 into the wavelength selecting units 303 and 304. The branching unit 302 splits optical signals that are inputted from the terminal station 400 to the optical add-drop multiplexer 300 into the wavelength selecting units 303 and 304. The optical signals inputted from the terminal station 400 to the optical add-drop multiplexer 300 may be optical signals of a single wavelength or may be wavelength-division multiplexed optical signals.

Each of the wavelength selecting units 303 and 304 extracts an optical signal of a predetermined wavelength from the wavelength-division multiplexed optical signals inputted from the branching units 301 and 302, and outputs the extracted signal to the output unit 305. The output unit 305 outputs either the optical signal inputted from the wavelength selecting unit 303 or the optical signal inputted from the wavelength selecting unit 304 to the terminal station 200.

To implement the Drop function, the optical add-drop multiplexer 300 uses an optical coupler or the like to split, before the branching unit 301, the wavelength-division multiplexed optical signals inputted from the terminal station 100, and outputs branched signals to the terminal station 400.

The branching units 301 and 302 each include an optical component having an optical splitting function, such as an optical coupler. The wavelength selecting units 303 and 304 each include, for example, a WSS. If the wavelength selecting units 303 and 304 each include a WSS, the units 303 and 304 may, for example, distribute the inputted wavelength-division multiplexed optical signals into a plurality of output ports according to their wavelengths or adjust optical power levels by attenuating the power levels according to the wavelengths. The output unit 305 includes an optical component having a function to switch optical paths, such as an optical switch.

Figure 3:
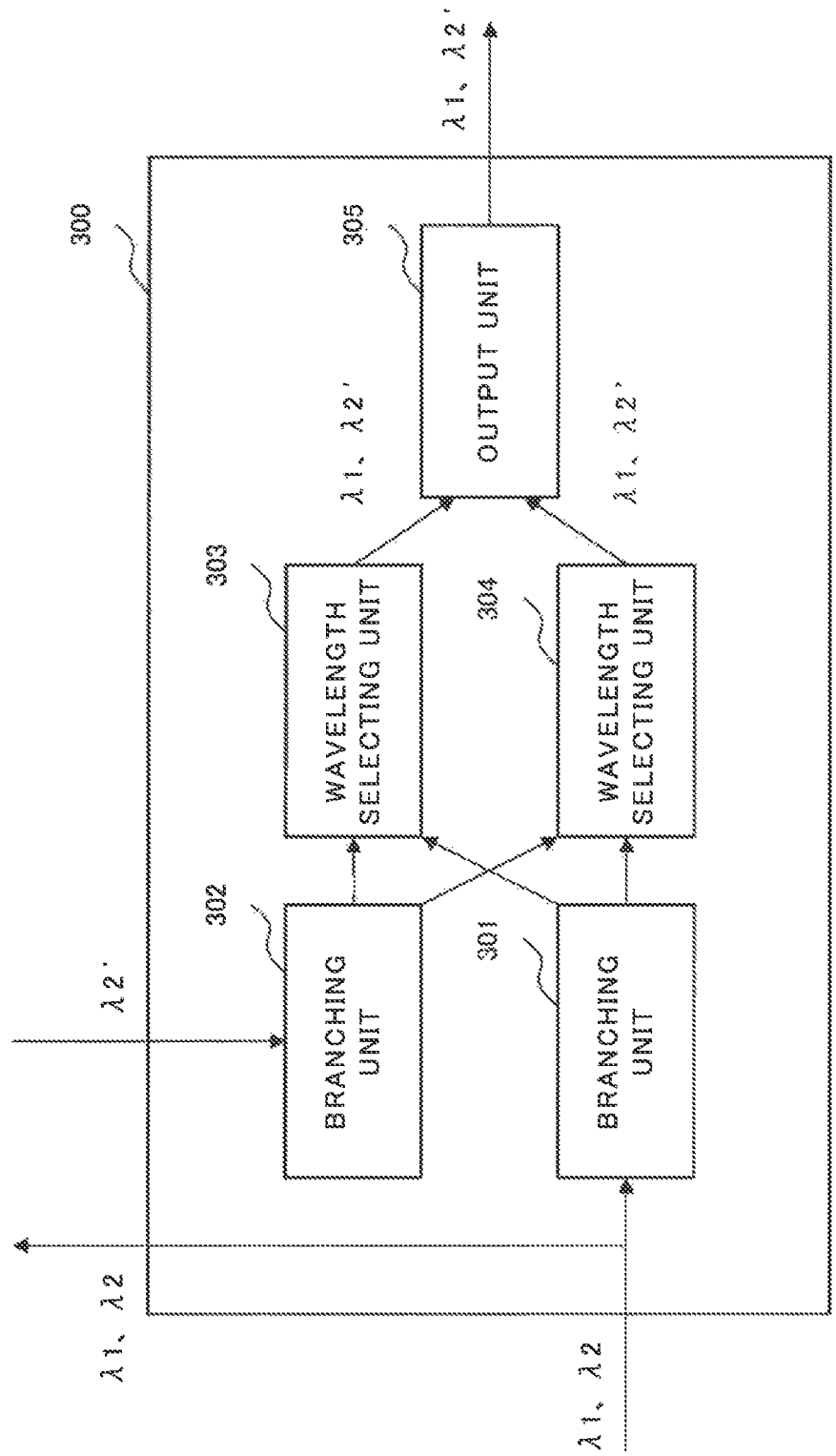
FIG. 3 illustrates example flows of optical signals having their respective wavelengths in the optical add-drop multiplexer 300 according to the first example embodiment.

FIG. 3 illustrates flows of optical signals transmitted in the optical add-drop multiplexer 300, where wavelength-division multiplexed optical signals including optical signals of wavelengths λ1 and λ2 are sent from the terminal station 100 to the terminal station 200. The optical add-drop multiplexer 300 adds/drops optical signals of wavelengths λ2 and λ2'. Wavelengths λ2' and λ2 are of the same wavelength, but with different information content since their optical signals are outputted from the terminal station 100 and the terminal station 400, respectively.

The branching unit 301 branches and outputs the wavelength-division multiplexed optical signals, which are inputted from the terminal station 100 and include optical signals of wavelengths λ1 and λ2, into the wavelength selecting units 303 and 304. On the other hand, the branching unit 302 branches and outputs the optical signals of wavelength λ2', which are inputted from the terminal station 400, into the wavelength selecting units 303 and 304.

The wavelength selecting units 303 and 304 each select optical signals of wavelengths λ1 and λ2 from among the inputted optical signals of wavelengths λ1, λ2, and λ2', and output the selected optical signals to the output unit 305. Since wavelengths λ2 and λ2' are of the same wavelength, the wavelength selecting units 303 and 304 each preferably have a plurality of input ports to accept the wavelength λ2 and the wavelength λ2' on different ports so as to prevent the wavelengths λ2 and λ2' from interfering with each other.

For example, if the wavelength selecting units 303 and 304 are WSSs, an output port to which optical signals of wavelengths λ1 and λ2' are outputted is connected to the output unit 305, while another output port to which optical signals of wavelength λ2 are outputted is connected to anything other than the output unit 305. Alternatively, the wavelength selecting units 303 and 304 may attenuate the level of optical signals of wavelength λ2.

The output unit 305 selects either the wavelength selecting unit 303 or the wavelength selecting unit 304, and outputs the optical signals of wavelengths λ1 and λ2', as inputted from the selected wavelength selecting unit, to the terminal station 200.

Figure 4:
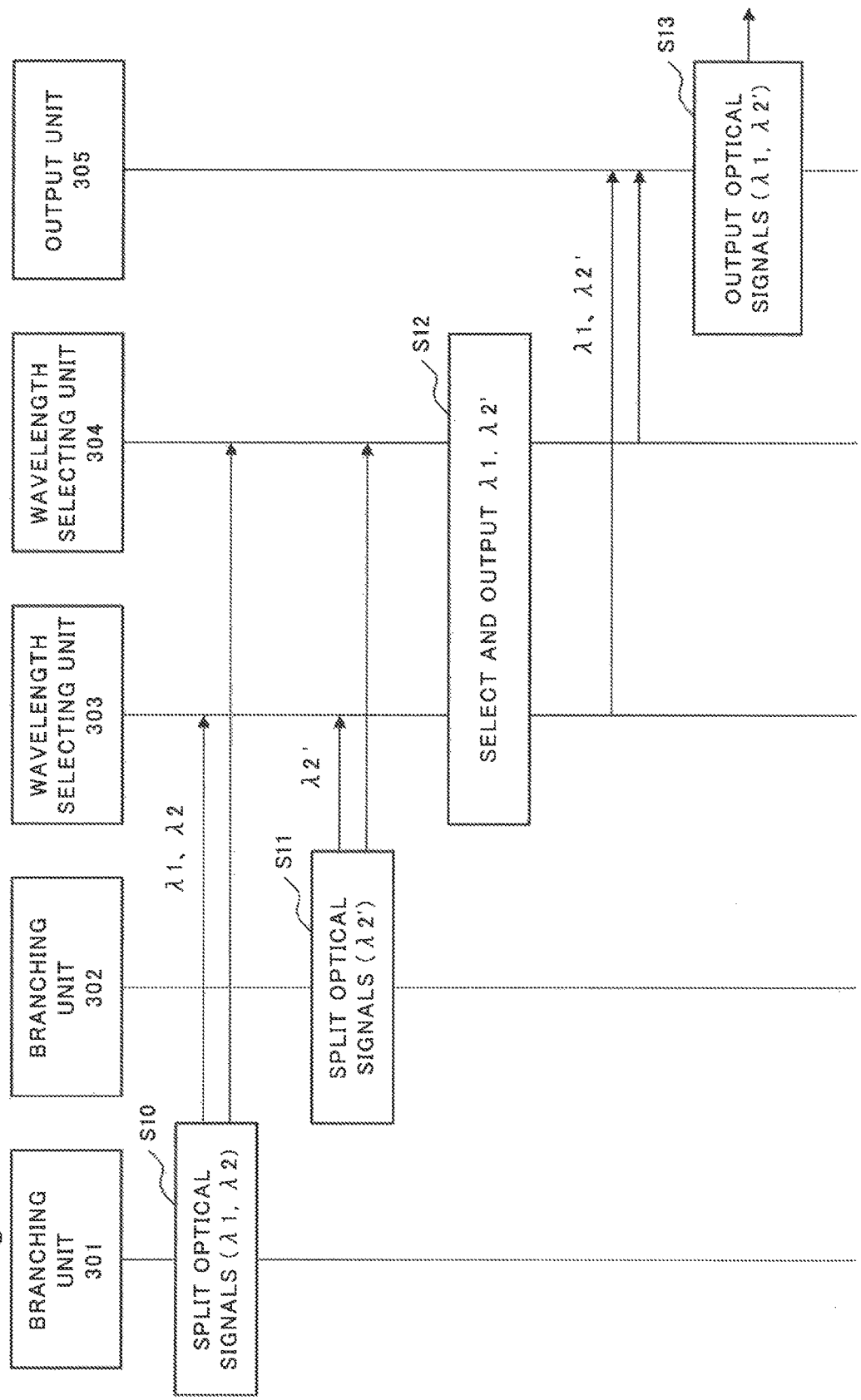
FIG. 4 illustrates example operations according to the first example embodiment.

FIG. 4 illustrates operations of the individual components in the optical add-drop multiplexer 300 in time series. The branching unit 301 splits the wavelength-division multiplexed optical signals, which are inputted from the terminal station 100 and include optical signals of wavelengths λ1 and λ2, into the wavelength selecting units 303 and 304 (S10).

The branching unit 302 splits the optical signals of wavelength λ2' inputted from the terminal station 400 into the wavelength selecting units 303 and 304 (S11).

Each of the wavelength selecting units 303 and 304 selects optical signals of wavelengths λ1 and λ2' from the wavelength-division multiplexed optical signals including optical signals of wavelengths λ1 and λ2 and from the optical signals of wavelength λ2', as inputted from the branching units 301 and 302, and outputs the selected optical signals to the output unit 305 (S12).

The output unit 305 selects either the wavelength selecting unit 303 or the wavelength selecting unit 304, and outputs the optical signals of wavelengths λ1 and λ2', as inputted from the selected selecting unit, to the terminal station 200 (S13).

The output unit 305 may include an optical coupler or the like for combining optical signals inputted from the wavelength selecting unit 303 with optical signals inputted from the wavelength selecting unit 304. In this case, the optical signal to be outputted from the output unit 305 is selected in advance by the branching units 301 and 302 or by the wavelength selecting units 303 and 304.

If the optical signal to be outputted from the output unit 305 is selected by the branching units 301 and 302, the branching units 301 and 302 each include an optical switch. The branching units 301 and 302 then output optical signals to either the wavelength selecting unit 303 or the wavelength selecting unit 304.

If the optical signal to be outputted from the output unit 305 is selected by the wavelength selecting units 303 and 304, the wavelength selecting unit 303 and 304 each include, for example, a WSS. In this case, a setting is made so as to prevent one of the WSSs from outputting optical signals of wavelengths λ1 and λ2' to the output unit 305.

Second Example Embodiment

Figure 5:
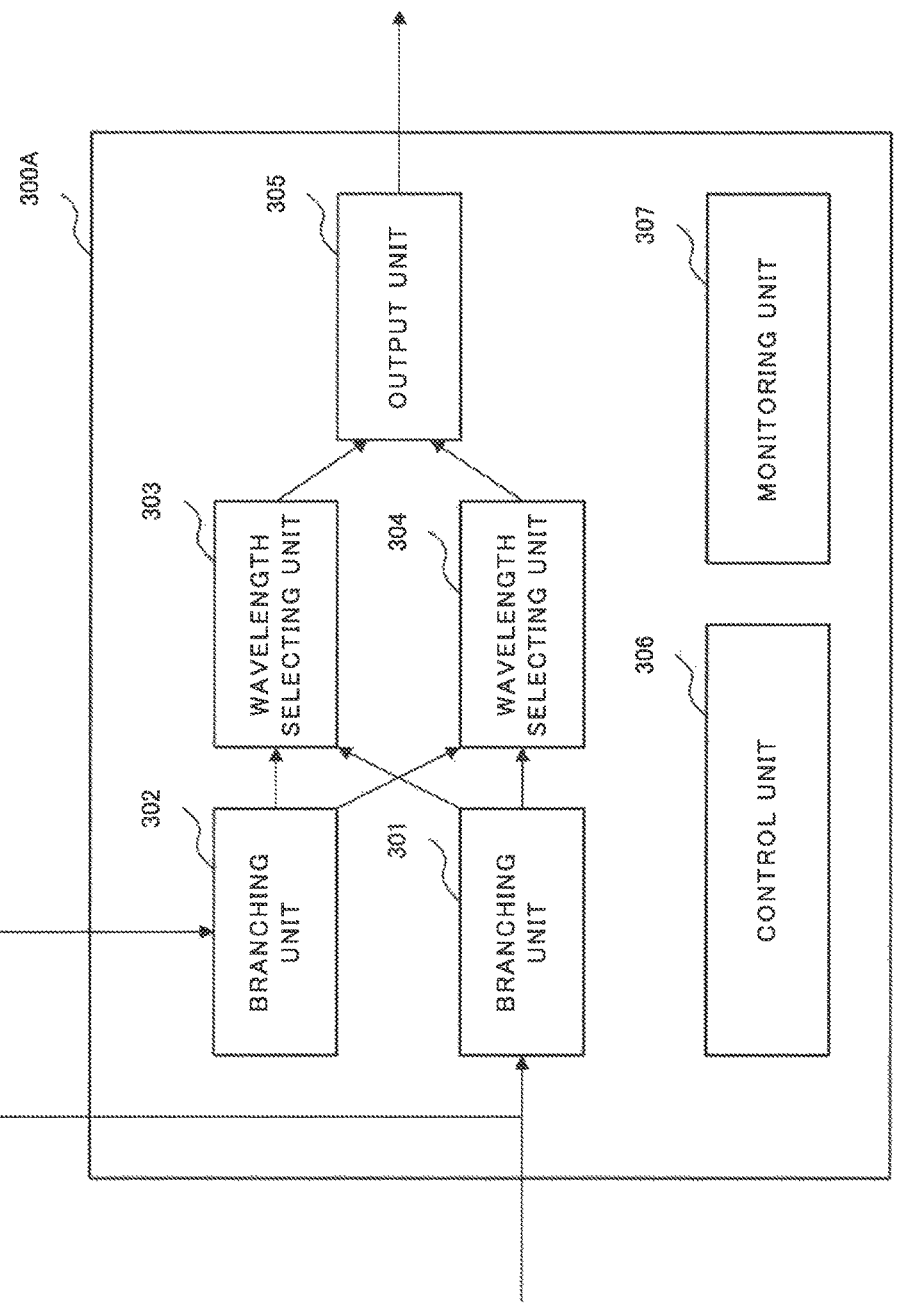
FIG. 5 is a block configuration diagram illustrating an optical add-drop multiplexer 300A according to a second example embodiment.

An optical add-drop multiplexer 300A according to a second example embodiment includes a monitoring unit for monitoring the state of the network and the local multiplexer itself and a control unit for switching optical signals to be outputted depending on the monitoring result. FIG. 5 illustrates an example configuration of the optical add-drop multiplexer 300A according to the present example embodiment.

The monitoring unit 307 monitors the state of the network to which the optical add-drop multiplexer 300A belongs and of the local multiplexer itself, and outputs the result of monitoring. The state of the network monitored by the monitoring unit 307 may be, for example, the state of the network configuration such as topology, the state of traffic, or the state of loads imposed on devices included in the network. Additionally, the monitoring unit 307 may monitor any occurrence of a failure and the state of communication in the individual components of the optical add-drop multiplexer 300A. The monitoring unit 307 may also receive information about the state of the network from an external monitoring device.

The control unit 306 switches optical signals to be outputted from the output unit 305 depending on the outputted result of monitoring. For example, when the monitoring unit 307 detects a failure in the wavelength selecting unit 304, the control unit 306 controls the output unit 305 so that optical signals coming from the wavelength selecting unit 303 are outputted from the output unit 305. If, for example, the output unit 305 is a component capable of switching paths, such as an optical switch, the control unit 306 causes the output unit 305 to switch paths between input and output ports in the output unit 305. In another example, if each of the wavelength selecting units 303 and 304 is a WSS, the control unit 306 controls a combination of an input port with an output port for a wavelength or controls the amount of optical power attenuation for each wavelength. If, for example, each of the branching units 301 and 302 is a component having a switching function such as an optical switch, the control unit 306 controls output paths for the branching units 301 and 302.

As described above, the optical add-drop multiplexer 300A according to the present example embodiment includes the monitoring unit 307, which monitors the state of the network to which the optical add-drop multiplexer 300A belongs and of the local multiplexer itself. As a result, in case of a failure, the control unit 306 can immediately and precisely switch optical signal paths on the basis of the monitoring result outputted from the monitoring unit 307.

Third Example Embodiment

Figure 6:
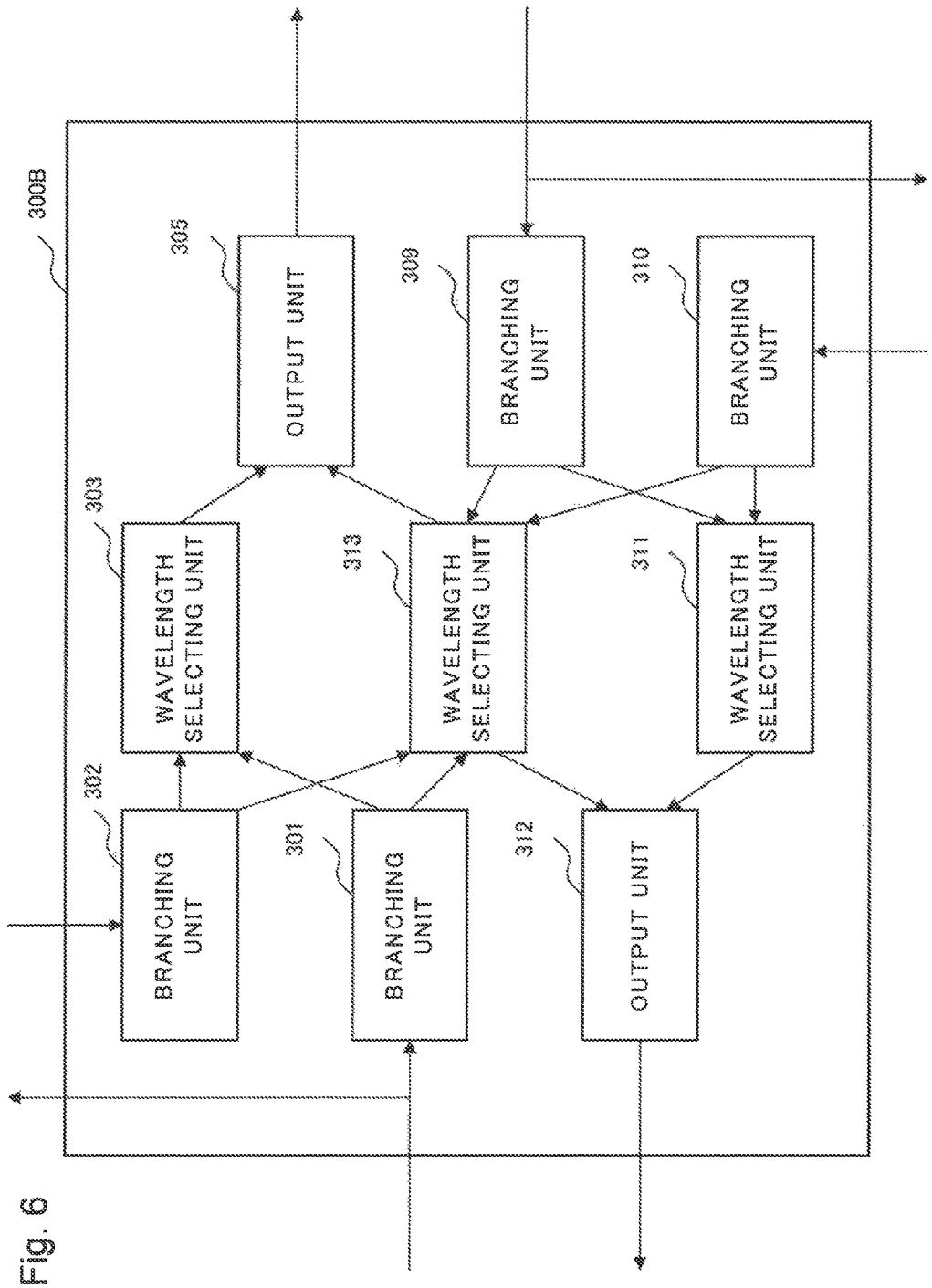
FIG. 6 is a block configuration diagram illustrating an optical add-drop multiplexer 300B according to a third example embodiment.

FIG. 6 is a block configuration diagram illustrating an optical add-drop multiplexer 300B according to a third example embodiment. The optical add-drop multiplexer 300B has a two-way communication configuration that deals with both the optical transmission from the terminal station 100 to the terminal station 200 and the optical transmission from the terminal station 200 to the terminal station 100. The optical add-drop multiplexer 300B uses an optical coupler or the like to split, before the branching unit 309, the wavelength-division multiplexed optical signals inputted from the terminal station 200, and outputs branched signals to the terminal station 400. In addition, optical signals from the terminal station 400 are inputted to the branching unit 310.

The branching unit 309, the branching unit 310, the wavelength selecting unit 311, and the output unit 312 respectively correspond to the branching unit 301, the branching unit 302, the wavelength selecting unit 303, and the output unit 305. The branching unit 301 receives wavelength-division multiplexed optical signals from the terminal station 100, while the branching unit 309 receives wavelength-division multiplexed optical signals from the terminal station 200. Likewise, the output unit 305 outputs wavelength-division multiplexed optical signals to the terminal station 200, while the output unit 312 outputs wavelength-division multiplexed optical signals to the terminal station 100.

The wavelength selecting unit 313 extracts an optical signal of a predetermined wavelength from the wavelength-division multiplexed optical signals inputted from the branching units 301 and 302, and outputs the extracted signal to the output unit 305. In addition, the wavelength selecting unit 313 extracts an optical signal of a predetermined wavelength from the wavelength-division multiplexed optical signals inputted from the branching units 309 and 310, and outputs the extracted signal to the output unit 312. The wavelength selecting unit 313 may implement the selection of an input source and an output destination by, for example, switching paths like an optical switch or using any of a plurality of input ports and output ports.

Variation of Third Example Embodiment

Figure 7:
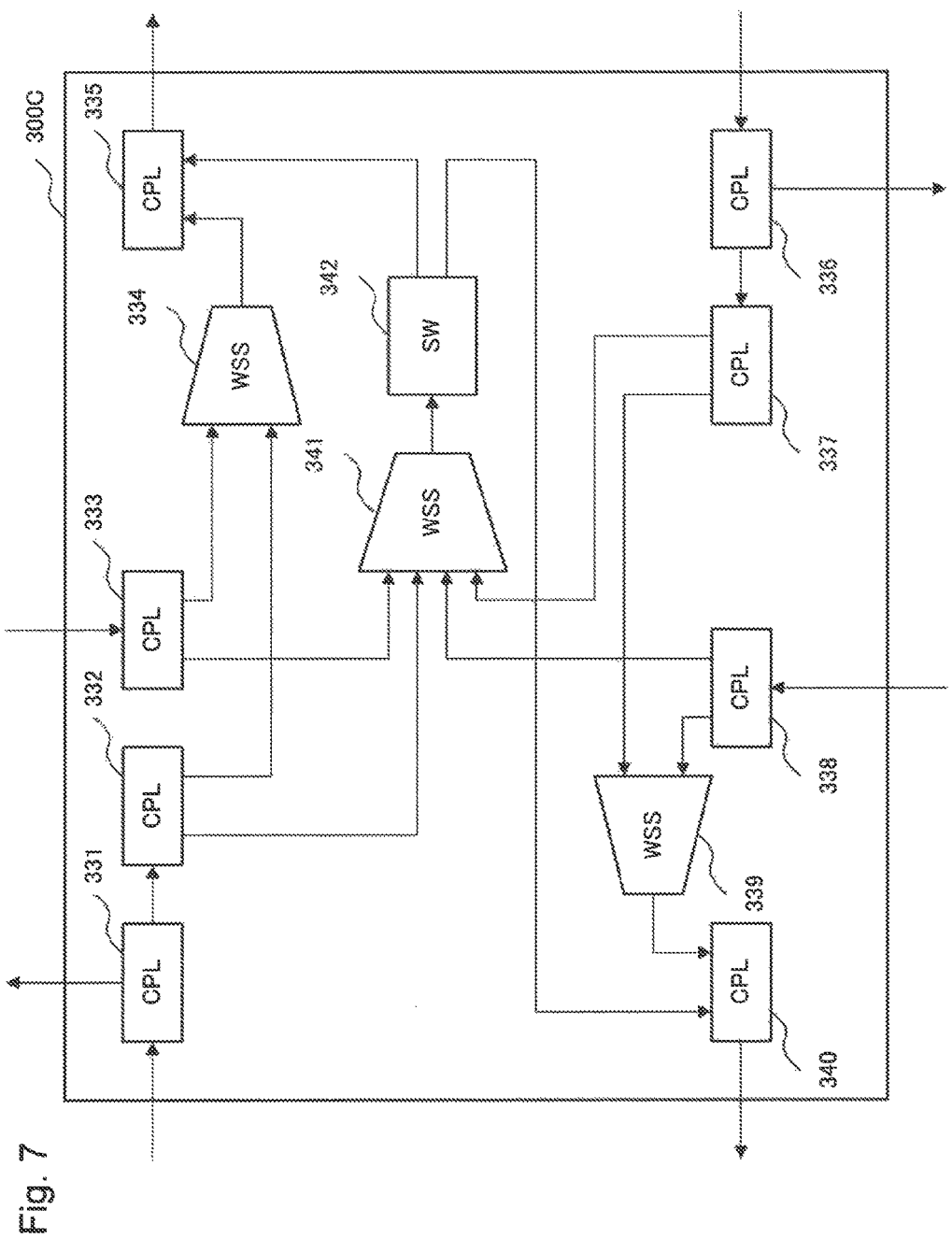
FIG. 7 is a block configuration diagram illustrating an optical add-drop multiplexer 300C according to a variation of the third example embodiment.

FIG. 7 is a block configuration diagram illustrating an optical add-drop multiplexer 300C according to a variation of the third example embodiment. The optical add-drop multiplexer 300C in FIG. 7 includes eight optical couplers (CPLs) 331, 332, 333, 335, 336, 337, 338, and 340, three wavelength selective switches (WSSs) 334, 339, and 341, and one optical switch (SW) 342.

The CPL 331 bifurcates wavelength-division multiplexed optical signals including optical signals of wavelengths $\lambda 1$ and $\lambda 2$, as inputted from the terminal station 100, to output them to the terminal station 400 and the CPL 332. The CPL 332 bifurcates the inputted wavelength-division multiplexed optical signals including optical signals of wavelengths $\lambda 1$ and $\lambda 2$ to output them to the WSSs 334 and 341.

The CPL 333 bifurcates optical signals of wavelength $\lambda 2'$, as inputted from the terminal station 400, to output them to the WSSs 334 and 341. Wavelengths $\lambda 2$ and $\lambda 2'$ are of the same wavelength, but with different information content since their optical signals are outputted from the terminal station 100 and the terminal station 400, respectively.

The WSS 334 extracts optical signals of wavelengths $\lambda 1$ and $\lambda 2'$ from wavelength-division multiplexed optical signals including optical signals of wavelengths $\lambda 1$ and $\lambda 2$ as well as from optical signals of wavelength $\lambda 2'$, as inputted from the CPLs 332 and 333, and outputs the extracted optical signals of wavelengths $\lambda 1$ and $\lambda 2'$ to the CPL 335. The CPL 335 combines the optical signals of wavelengths $\lambda 1$ and $\lambda 2'$, as inputted from the WSS 334, with the optical signals of wavelengths $\lambda 1$ and $\lambda 2'$, as inputted from the SW 342, which will be described later, and outputs a resultant signal to the terminal station 200.

The CPL 336 bifurcates wavelength-division multiplexed optical signals including optical signals of wavelengths $\lambda 3$ and $\lambda 4$ to output them to the terminal station 400 and the CPL 337. The CPL 337 bifurcates the inputted wavelength-division multiplexed optical signals including optical signals of wavelengths $\lambda 3$ and $\lambda 4$ to output them to the WSSs 339 and 341.

The CPL 338 bifurcates optical signals of wavelength $\lambda 4'$, as inputted from the terminal station 400, to output them to the WSSs 339 and 341. Wavelengths $\lambda 4$ and $\lambda 4'$ are of the same wavelength, but with different information content since their optical signals are outputted from the terminal station 200 and the terminal station 400, respectively.

The WSS 339 extracts optical signals of wavelengths $\lambda 3$ and $\lambda 4'$ from wavelength-division multiplexed optical signals including optical signals of wavelengths $\lambda 3$ and $\lambda 4$ as well as from optical signals of wavelength $\lambda 4'$, as inputted from the CPLs 337 and 338, and outputs the extracted optical signals of wavelengths $\lambda 3$ and $\lambda 4'$ to the CPL 340. The CPL 340 combines the optical signals of wavelengths $\lambda 3$ and $\lambda 4'$, as inputted from the WSS 339, with the optical signals of wavelengths $\lambda 3$ and $\lambda 4'$, as inputted from the SW 342, which will be described later, and outputs a resultant signal to the terminal station 100.

In accordance with an instruction given by a control unit (not illustrated), the WSS 341 extracts an optical signal of a predetermined wavelength from the wavelength-division multiplexed optical signals and the optical signals, as inputted from the CPLs 332, 333, 337, and 338, and outputs the extracted optical signal to the SW 342. Optical signals inputted to the WSS 341 according to the present example embodiment are: wavelength-division multiplexed optical signals including optical signals of wavelengths $\lambda 1$ and $\lambda 2$, optical signals of wavelength $\lambda 2'$, wavelength-division multiplexed optical signals including optical signals of wavelengths $\lambda 3$ and $\lambda 4$, and optical signals of wavelength $\lambda 4'$.

In accordance with an instruction given by the control unit (not illustrated), the SW 342 selects either the CPL 335 or the CPL 340, and outputs optical signals inputted from the WSS 341 to the selected CPL. The SW 342 may be configured to additionally select the ground.

The control unit (not illustrated) operates as described below. When the WSSs 334 and 339 are normally operating, the control unit controls the WSS 341 so that a maximum attenuation level is set to the WSS 341 to prevent the WSS 341 from outputting optical signals. If the SW 342 can select the ground, the control unit causes the SW 342 to select the ground.

On the other hand, when the control unit determines that the WSS 334 has a failure, the control unit causes the WSS 341 to extract optical signals of wavelengths $\lambda 1$ and $\lambda 2'$ and output the extracted signals to the SW 342. In addition, the control unit causes the SW 342 to select the CPL 335 and output optical signals of wavelengths $\lambda 1$ and $\lambda 2'$, as inputted from the WSS 341, to the selected CPL 335. Thus, in case the WSS 334 has a failure, optical signals of wavelengths $\lambda 1$ and $\lambda 2'$ are still outputted to the terminal station 200 through the WSS 341, the SW 342, and the CPL 335.

On the other hand, when the control unit determines that the WSS 339 has a failure, the control unit causes the WSS 341 to extract optical signals of wavelengths $\lambda 3$ and $\lambda 4'$ and output the extracted signals to the SW 342. In addition, the control unit causes the SW 342 to select the CPL 340 and output optical signals of wavelengths λ3 and λ4', as inputted from the WSS 341, to the selected CPL 340. Thus, in case the WSS 339 has a failure, optical signals of wavelengths λ3 and λ4' are still outputted to the terminal station 100 through the WSS 341, the SW 342, and the CPL 340.

In general, a wavelength selective device, e.g., a WSS, includes optical elements such as micro-electro-mechanical systems (MEMS) and liquid crystal on silicon (LCOS), optical components such as lenses, and electronic circuits. Accordingly, a WSS tends to be expensive and carries a higher risk of failure than general optical devices.

On the other hand, the optical add-drop multiplexer 300C according to the present example embodiment uses the WSS 341 in common, as a backup WSS to be used when a failure or the like occurs in the WSS 334 or WSS 339. Using the WSS 341 in case of a failure or the like in the WSS 334 or WSS 339 can reduce line disconnects between trunk and branch stations and signal deteriorations. Thus, for a submarine optical cable system and other systems on which requirements for reliable, long-lasting stable operations are imposed, the present example embodiment can ensure the reliability at lower cost.

Each of the CPLs 335 and 340, which are included in the optical add-drop multiplexer 300C illustrated in FIG. 7 and are used for outputting optical signals to the terminal station 100 or 200, may be replaced by an optical switch. In this case, for example, if a breakdown occurs in such a way that the WSS 339 allows optical signals including abnormal signals to flow into the optical switch that replaces the CPL 340, the optical switch can switch the input from the WSS 339 to the WSS 341, thereby preventing abnormal signals coming from the WSS 339 from merging with optical signals of wavelengths λ3 and λ4' to be outputted to the terminal station 200.

Fourth Example Embodiment

In a fourth example embodiment, an optical signal dropped in an optical add-drop multiplexer is combined with an optical signal outputted from a wavelength selecting unit. This makes it impossible to restore information in an optical signal of unwanted wavelength, as included in a dropped optical signal. In addition, one wavelength selecting unit can be used for filtering optical signals to be outputted to the terminal station 200, while the other wavelength selecting unit can be used for combining dropped optical signals with desired optical signals. Accordingly, the present example embodiment can enhance security by reducing transmission of unwanted information, while achieving efficient use of resources.

Figure 8:
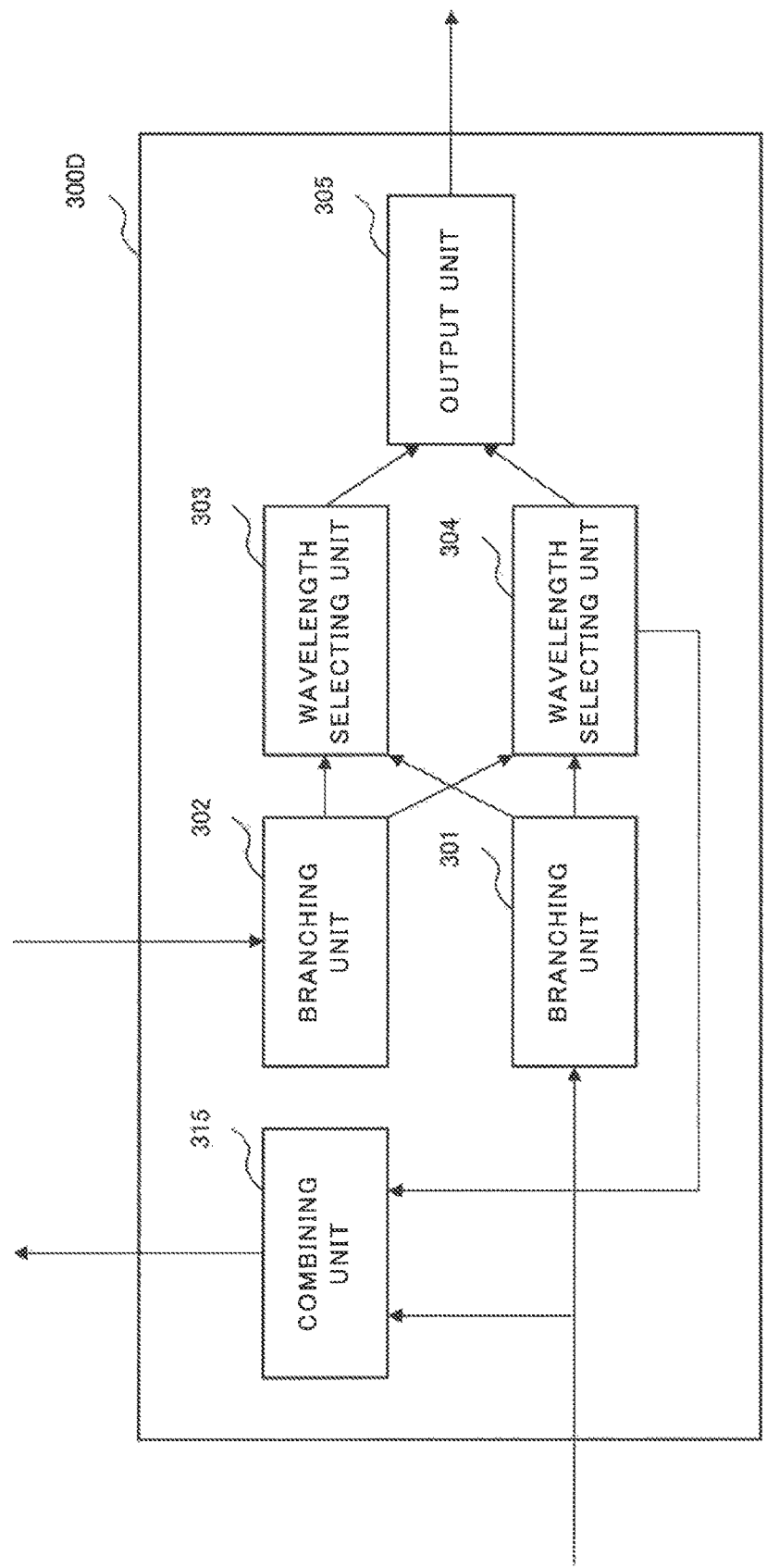
FIG. 8 is a block configuration diagram illustrating an optical add-drop multiplexer 300D according to a fourth example embodiment.

FIG. 8 is a block configuration diagram illustrating an optical add-drop multiplexer 300D according to the present example embodiment. The optical add-drop multiplexer 300D in FIG. 8 adds a combining unit 315 to the configuration of the optical add-drop multiplexer 300 according to the first example embodiment as illustrated in FIG. 2.

The wavelength selecting unit 304 extracts a plurality of optical signals of predetermined wavelengths from the wavelength-division multiplexed optical signals inputted from the branching units 301 and 302, and outputs the extracted optical signals to the combining unit 315 and to the output unit 305. The combining unit 315 combines the branched wavelength-division multiplexed optical signals, as inputted from the terminal station 100, with the optical signals coming from the wavelength selecting unit 304, and outputs a resultant signal to the terminal station 400.

Figure 9:
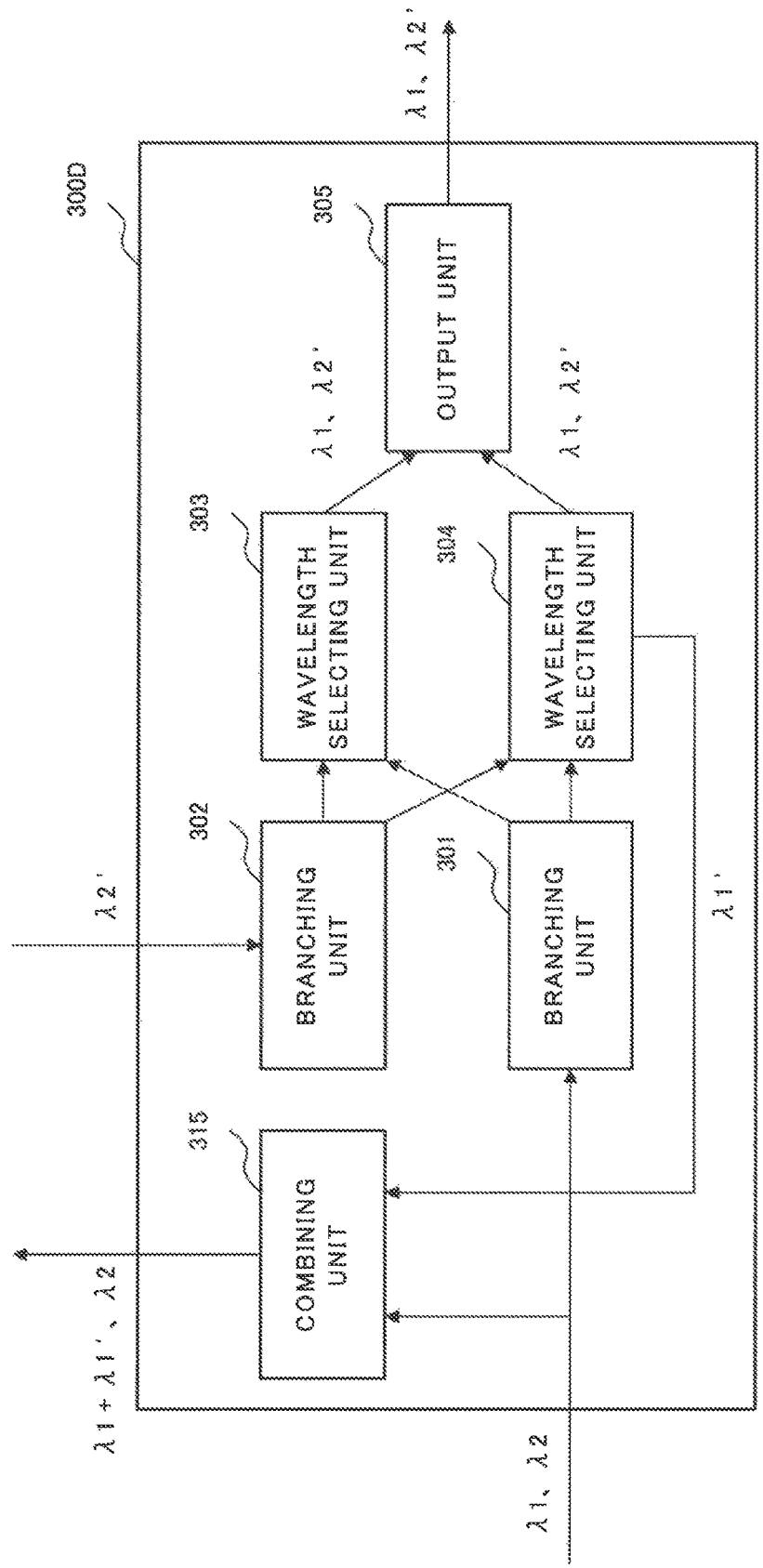
FIG. 9 illustrates example flows of optical signals having their respective wavelengths in the optical add-drop multiplexer 300D according to the fourth example embodiment.

FIG. 9 illustrates flows of optical signals transmitted in the optical add-drop multiplexer 300D, where wavelength-division multiplexed optical signals including optical signals of wavelengths λ1 and λ2 are sent from the terminal station 100 to the terminal station 200. The branching unit 301 branches and outputs the wavelength-division multiplexed optical signals, which are inputted from the terminal station 100 and include optical signals of wavelengths λ1 and λ2, into the wavelength selecting units 303 and 304. On the other hand, the branching unit 302 branches and outputs the optical signals of wavelength λ2', which are inputted from the terminal station 400, into the wavelength selecting units 303 and 304.

The wavelength selecting unit 304 selects an optical signal of wavelength λ1' from the inputted optical signals of wavelengths λ1, λ2, and λ2', and outputs the selected optical signal to the combining unit 315. The combining unit 315 combines the branched optical signals of wavelengths λ1 and λ2, as inputted from the terminal station 100, with the optical signal of wavelength λ1' inputted from the wavelength selecting unit 304, and outputs a resultant signal to the terminal station 400. Since wavelengths λ1 and λ1' are of the same wavelength, optical signals of wavelengths λ1 and λ1' will interfere with each other at the combining unit 315. The interference with each other causes the modulation pattern included in the optical signal of wavelength λ1 to be mixed with the modulation pattern included in the optical signal of wavelength λ1', which makes it impossible to restore the optical signal of wavelength λ1 from optical signals inputted from the combining unit 315 to the terminal station 400.

In normal times (no failure occurring), the optical add-drop multiplexer 300D as configured above allows the wavelength selecting unit 303 to output optical signals of wavelengths λ1 and λ2' to the output unit 305, while allowing the wavelength selecting unit 304 to output optical signals of wavelength λ1' to the combining unit 315. On the other hand, in case a failure occurs in the wavelength selecting unit 303, the optical add-drop multiplexer 300D switches operations so that the wavelength selecting unit 304 outputs optical signals of wavelengths λ1 and λ2' to the output unit 305.

Fifth Example Embodiment

Figure 10:
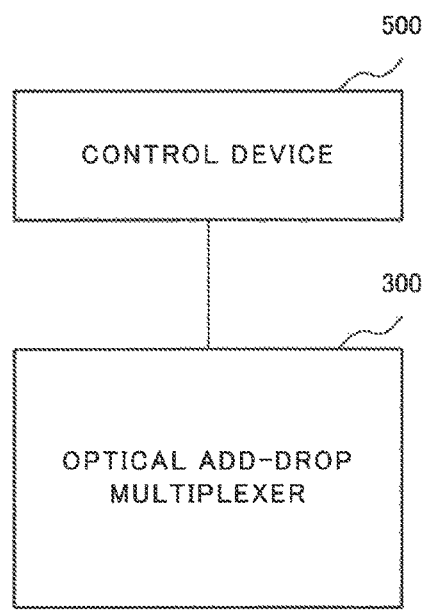
FIG. 10 is a system configuration diagram illustrating an optical communication system according to a fifth example embodiment.

FIG. 10 is a system configuration diagram illustrating an optical communication system according to a fifth example embodiment. Any of the optical add-drop multiplexers 300A to 300D described in the respective example embodiments may be applied to the optical add-drop multiplexer 300. A control device 500 gives an instruction regarding communications to the optical add-drop multiplexer 300 by sending control information thereto.

Figure 11:
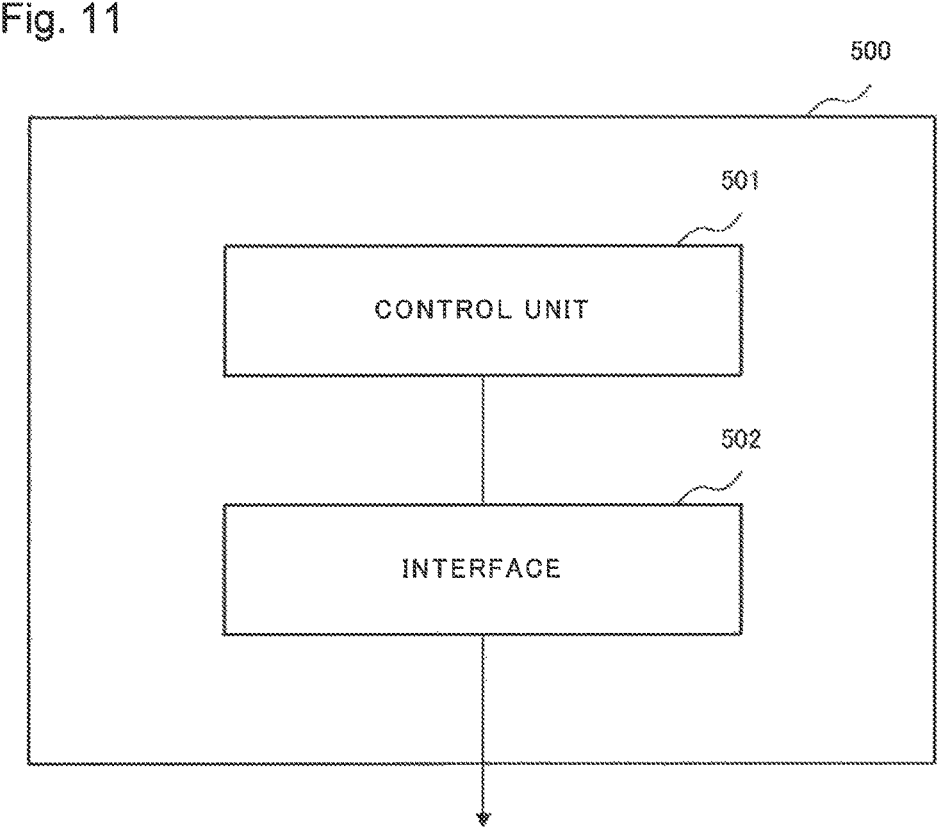
FIG. 11 is a block configuration diagram illustrating a control device 500 according to the fifth example embodiment.

FIG. 11 is a block configuration diagram illustrating the control device 500. The control device 500 includes a control unit 501 and an interface 502. The control unit 501 communicates with the optical add-drop multiplexer 300 via the interface 502.

The control unit 501 causes the optical add-drop multiplexer 300 to select either the wavelength selecting unit 303 or the wavelength selecting unit 304 and to output optical signals coming from the selected wavelength selecting unit through the output unit 305.

The optical add-drop multiplexer 300 switches internal optical signal paths, in accordance with an instruction given by the control unit 501. The control unit 501 causes the optical add-drop multiplexer 300 to select the wavelength selecting unit 303 in normal times, while causing the multiplexer 300 to select the wavelength selecting unit 304 in case of a failure.

The control unit 501 may give an instruction so that the output unit 305 selects either the wavelength selecting unit 303 or the wavelength selecting unit 304 and outputs optical signals therefrom. The control unit 501 may also give an instruction so that input/output ports and output wavelengths for the wavelength selecting units 303 and 304 are configured. The control unit 501 may also give an instruction so that the branching units 301 and 302 output optical signals to either the wavelength selecting unit 303 or the wavelength selecting unit 304.

The control unit 501 may obtain status information about the optical communication network and optical add-drop multiplexer 300 from the multiplexer 300 itself or from another device included in the network, and control the optical add-drop multiplexer 300 on the basis of the status information. The control unit 501 may obtain a result of monitoring from, for example, the monitoring unit 307 illustrated in FIG. 5.

Other Example Embodiments

The whole or part of the above example embodiments can be described as, but is not limited to, the following supplementary notes.

(Supplementary Note 1)

An optical communication device dropping and adding an optical signal from and to wavelength-division multiplexed optical signals that are transmitted on a main path between network terminal stations, the device including:

first means and second means capable of selecting an optical signal of a predetermined wavelength from inputted optical signals and of outputting the selected optical signal;

third means for splitting optical signals inputted from a first terminal station on the main path into the first means and the second means;

fourth means for splitting optical signals inputted from a branch path in the network into the first means and the second means; and fifth means capable of selectively outputting to a second terminal station on the main path either an optical signal outputted by the first means or an optical signal outputted by the second means.

(Supplementary Note 2)

The optical communication device according to Supplementary Note 1, further including:

sixth means capable of performing control so that an optical signal outputted by the fifth means is switched between an optical signal outputted by the first means and an optical signal outputted by the second means.

(Supplementary Note 3)

The optical communication device according to Supplementary Note 2, further including:

seventh means capable of monitoring a state of the communication device, wherein the sixth means performs control so that an optical signal outputted by the fifth means is switched between an optical signal outputted by the first means and an optical signal outputted by the second means, depending on a result of monitoring by the seventh means.

(Supplementary Note 4)

The optical communication device according to any one of Supplementary notes 1 to 3, further including:

eighth means capable of outputting an optical signal to the first terminal station, wherein the second means is capable of selecting an optical signal of a predetermined wavelength from optical signals inputted from the second terminal station and from the branch path, and of outputting the selected optical signal to the eighth means.

(Supplementary Note 5)

The optical communication device according to any one of Supplementary Notes 1 to 4, further including:

ninth means for combining an optical signal inputted from the first terminal station with an optical signal outputted by the second means, and for outputting a resultant signal to the branch path, wherein the second means is capable of outputting to the ninth means optical signals including at least one of wavelengths included in optical signals inputted from the first terminal station.

(Supplementary Note 6)

The optical communication device according to any one of Supplementary Notes 1 to 5, wherein the first means and the second means each include a wavelength selective switch.

(Supplementary Note 7)

An optical communication method for dropping and adding an optical signal from and to wavelength-division multiplexed optical signals that are transmitted on a main path between network terminal stations, the method including:

splitting optical signals inputted from a first terminal station on the main path into first and second wavelength selecting units that are capable of selectively outputting a predetermined wavelength;

splitting optical signals inputted from a branch path in the network into the first and second wavelength selecting units; and selectively outputting to a second terminal station on the main path either an optical signal outputted by the first wavelength selecting unit or an optical signal outputted by the second wavelength selecting unit.

(Supplementary Note 8)

The optical communication method according to Supplementary Note 7, including:

outputting either an optical signal outputted by the first wavelength selecting unit or an optical signal outputted by the second wavelength selecting unit by switching from each other.

(Supplementary Note 9)

The optical communication method according to Supplementary Note 7 or 8, including:

monitoring a state of an optical communication device that includes the first and second wavelength selecting units; and outputting either an optical signal outputted by the first wavelength selecting unit or an optical signal outputted by the second wavelength selecting unit by switching from each other, depending on a result of the monitoring.

(Supplementary Note 10)

The optical communication method according to any one of Supplementary Notes 7 to 9, including:

combining an optical signal that is inputted from the first terminal station with an optical signal that is outputted by the second wavelength selecting unit and includes at least one of wavelengths included in optical signals inputted from the first terminal station, and outputting a resultant signal to the branch path.

(Supplementary Note 11)

An optical communication system including:

an optical communication device dropping and adding an optical signal from and to wavelength-division multiplexed optical signals that are transmitted on a main path between network terminal stations; and a control device controlling the optical communication device, wherein the optical communication device includes:

first means and second means capable of selecting an optical signal of a predetermined wavelength from inputted optical signals and outputting the selected optical signal;

third means for splitting optical signals that are inputted from a first terminal station on the main path to the optical communication device into the first means and the second means;

fourth means for splitting optical signals that are inputted from a branch path in the network to the optical communication device into the first means and the second means; and fifth means capable of outputting an optical signal to a second terminal station on the main path, and wherein the control device instructs the optical communication device to cause the fifth means to selectively output either an optical signal outputted by the first means or an optical signal outputted by the second means.

(Supplementary Note 12)

A program used for an optical communication device dropping and adding an optical signal from and to wavelength-division multiplexed optical signals that are transmitted on a main path between network terminal stations, the program being executed to:

split optical signals inputted from a first terminal station on the main path into first and second wavelength selecting units that are capable of selectively outputting a predetermined wavelength;

split optical signals inputted from a branch path in the network into the first and second wavelength selecting units; and selectively output to a second terminal station on the main path either an optical signal outputted by the first wavelength selecting unit or an optical signal outputted by the second wavelength selecting unit.

The present invention is not limited to the above example embodiments and includes design changes and the like that do not depart from the spirit and scope of the present invention.

INDUSTRIAL APPLICABILITY

The present invention may be widely applied to optical communication systems having a function to add/drop an optical signal of a predetermined wavelength.

The present application claims priority based on Japanese Patent Application No. 2014-157718 filed on Aug. 1, 2014, the entire disclosure of which is incorporated herein.

REFERENCE SIGNS LIST

100, 200, 400 Terminal station
300, 300A to 300D Optical add-drop multiplexer
301, 302 Branching unit
303, 304 Wavelength selecting unit
305 Output unit
306 Control unit
307 Monitoring unit
309, 310 Branching unit
311, 313 Wavelength selecting unit
312 Output unit
331, 332, 333, 335 Optical coupler
336, 337, 338, 340 Optical coupler
334, 339, 341 WSS
342 Optical switch
315 Combining unit
500 Control device
501 Control unit
502 Interface

The invention claimed is:

1. An optical add/drop multiplexer device comprising:
   a first splitter configured to split an input optical signal from a first trunk station on a first path;
   a second splitter configured to split an input optical signal from a first branch station on a second path;
   a first wavelength selector configured to select a first optical signal of a first wavelength from split optical signals from the first splitter and the second splitter, and configured to output the first optical signal;
   a second wavelength selector configured to select a second optical signal of the first wavelength from split optical signals from the first splitter and the second splitter, and configured to output the second optical signal;
   a first interface configured to output selectivity to a second trunk station on the first path either the first optical signal or the second optical signal;
   a third splitter configured to split an input optical signal from the second trunk station on the first path;
   a fourth splitter configured to split an input optical signal from a second branch station on the second path;
   a third wavelength selector configured to select a third optical signal of a second wavelength from split optical signals from the third splitter and the fourth splitter, and configured to output the third optical signal; and
   a second interface configured to output an optical signal to the first terminal station,
   wherein the second wavelength selector is configured to select a fourth optical signal of the second wavelength from split optical signals from the third splitter and the fourth splitter, and configured to output the fourth optical signal to the second interface, and
   wherein the second interface is configured to output selectivity to the first trunk station on the first path either the third optical signal or the fourth optical signal.

2. The optical add/drop multiplexer device according to claim 1, further comprising:
   a controller configured to control so that an output optical signal from the first interface is switched between the first optical signal and the second optical signal.

3. The optical add/drop multiplexer device according to claim 2, further comprising:
   a monitor configured to monitor a state of the add/drop multiplexer device,
   wherein the controller is configured to control so that an output optical signal from the first interface is switched between the first optical signal and the second optical signal, depending on a result of monitoring by the monitor.

4. The optical add/drop multiplexer device according to claim 1,
   wherein the first wavelength selector and the second wavelength selector each includes a wavelength selective switch.

5. An optical add/drop multiplexer method comprising:
   splitting an input optical signal from a first trunk station on a first path by a first splitter;

splitting an input optical signal from a first branch station on a second path by a second splitter;

selecting a first optical signal of a first wavelength from split optical signals split from the first splitter and the second splitter, and outputting the first optical signal, by a first wavelength selector;

selecting a second optical signal of the first wavelength from split optical signals from the first splitter and the second splitter, and output the first optical signal, by a second wavelength selector;

outputting selectivity to a second trunk station on the first path either the first optical signal or the second optical signal by a first interface;

splitting an input optical signal from a second trunk station on the first path by a third splitter;

splitting an input optical signal from a second branch station on the second path by a fourth splitter;

selecting a third optical signal of a second wavelength from split optical signals from the third splitter and the fourth splitter, and outputting the third optical signal, by a third wavelength selector;

selecting a fourth optical signal of a second wavelength from split optical signals from the third splitter and the fourth splitter, and outputting the fourth optical signal, by the second wavelength selector; and outputting selectivity to the first trunk station on the first path either the third optical signal or the fourth optical signal.

6. The optical add/drop multiplexer method according to claim 5, comprising:

outputting either the first optical signal or the second optical signal by switching from each other.

7. The optical add/drop multiplexer method according to claim 5, comprising:

monitoring a state of an optical add/drop multiplexer device configured to include the first and second wavelength selectors; and outputting either the first optical signal or the second optical signal by switching from each other, depending on a result of the monitoring.

8. An optical add/drop multiplexer system comprising:

a control device configured to control the optical add/drop multiplexer device, wherein the optical add/drop multiplexer device includes:

a first splitter configured to split an input optical signal from a first trunk station on the first path;

a second splitter configured to split an input optical signal from a first branch station on the second path;

a first wavelength selector configured to select a first optical signal of a first wavelength from split optical signals from the first splitter and the second splitter, and configured to output the first optical signal;

a second wavelength selector configured to select a second optical signal of the first wavelength from split optical signals from the first splitter and the second splitter, and configured to output the second optical signal;

a first interface configured to output selectivity to a second trunk station on the first path either the first optical signal or the second optical signal;

a third splitter configured to split an input optical signal from the second trunk station on the first path;

a fourth splitter configured to split an input optical signal from a second branch station on the second path;

a third wavelength selector configured to select a third optical signal of a second wavelength from split optical signals from the third splitter and the fourth splitter, and configured to output the third optical signal; and a second interface configured to output a optical signal to the first terminal station, wherein the second wavelength selector is configured to select a fourth optical signal of the second wavelength from split optical signals from the third splitter and the fourth splitter, and configured to output the fourth optical signal to the second interface, wherein the second interface is configured to output selectivity to the first trunk station on the first path either the third optical signal or the fourth optical signal, and wherein the control device instructs the optical add/drop multiplexer device to cause the first interface to selectively output either the first optical signal or the second optical signal by the second wavelength selector and the second interface to selectively output either the third optical signal or the fourth optical signal.

9. The optical add/drop multiplexer device according to claim 2, wherein the first wavelength selector and the second wavelength selector each includes a wavelength selective switch.

10. The optical add/drop multiplexer device according to claim 3, wherein the first wavelength selector and the second wavelength selector each includes a wavelength selective switch.

11. The optical add/drop multiplexer system according to claim 8, wherein the first wavelength selector and the second wavelength selector each includes a wavelength selective switch.

12. The optical add/drop multiplexer method according to claim 6, comprising:

monitoring a state of an optical add/drop multiplexer device configured to include the first and second wavelength selectors; and outputting either the first optical signal or the second optical signal by switching from each other, depending on a result of the monitoring.

13. The optical add/drop multiplexer system according to claim 6, wherein the optical add/drop multiplexer device further comprising:

a controller configured to control so that an output optical signal from the first interface is switched between the first optical signal and the second optical signal.

* * * * *